Figure 1:
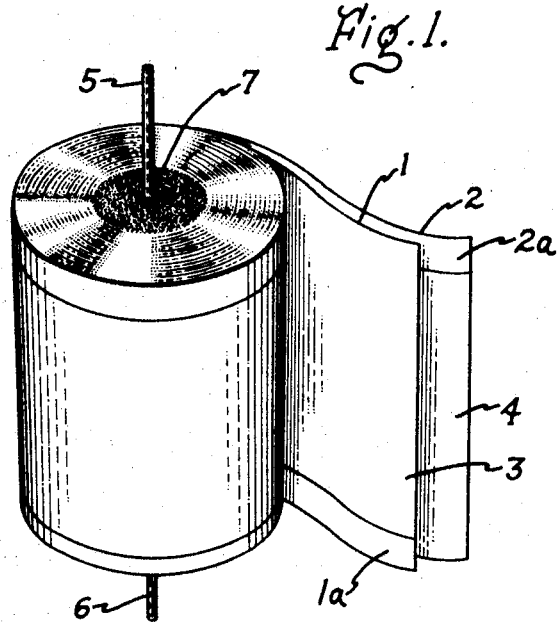

Aug. 8, 1961     J. ROSENBERG     2,995,688
ELECTRICAL DEVICE AND DIELECTRIC MATERIAL THEREFOR
Filed April 10, 1958

Inventor,
Joseph Rosenberg,
by *Gilbert P. Tarleton*
His Attorney.

United States Patent Office 2,995,688
Patented Aug. 8, 1961

2,995,688
ELECTRICAL DEVICE AND DIELECTRIC MATERIAL THEREFOR
Joseph Rosenberg, Erie, Pa., assignor to General Electric Company, a corporation of New York
Filed Apr. 10, 1958, Ser. No. 727,609
14 Claims. (Cl. 317—258)

The present invention relates to electrical devices and dielectric material therefor, and more particularly to electrical capacitors incorporating dielectric resin films which confer improved electrical properties thereon, especially under conditions of elevated temperature.

As is well known in the art, dielectric films of low power factor are desirable in capacitors to avoid energy loss and excessive heat generation in the capacitor which otherwise would cause undue shortening of the life of the capacitor. While various types of dielectric materials are known which may have satisfactory power factor properties at normal operating temperatures, the conventional dielectrics do not retain their low power factors under conditions of elevated temperature, e.g., 80–100° C. and above. Furthermore, known dielectric materials which may have satisfactory power factor characteristics have not in general been found suitable for making dielectric coating films on capacitor electrodes. Problems encountered with prior types of dielectric compositions in this respect are the poor adhesion of the material to capacitor electrodes, especially those in the form of metal foil, the brittleness and tendency of the films to crack particularly when the coated foils are wound into coil form, and the difficulty in forming thin, uniform, continuous coatings of the dielectric material on the electrode surface while still retaining satisfactory electrical properties of the dielectric, especially at elevated temperatures.

It is an object of the invention to provide electrical devices, particularly electrical capacitors, with dielectric material, especially in the form of spacer films, which confers improved electrical properties thereon, especially low power factor, under conditions of elevated temperature.

It is another object of the invention to provide a dielectric film or coating for capacitor electrodes, and other types of electrodes wherein the coating material is readily applied to form a uniform, thin, tightly adherent dielectric film thereon, especially where the electrodes are in the form of metal foils. Examples of other devices wherein these coatings may be used to great advantage to insulate metal foil are motor and generator field coils, transformer coils, solenoid coils and reactors.

It is still another object of the invention to provide a novel composition of matter for making dielectric products having improved electrical, chemical and physical properties.

It has been found in accordance with the invention that an improved dielectric material of the above type which is particularly adapted for incorporation in capacitors is provided by a composition of matter comprising the product obtained by reacting (1) an epoxide resin comprising a polyether derivative of a polyhydric organic compound, (2) a carboxylic acid anhydride and (3) an organic diisocyanate compound.

In particularly preferred embodiments of the invention, the anhydride component of the dielectric composition is hexachloroendomethylenetetrahydrophthalic anhydride or pyromellitic dianhydride, and the preferred diisocyanate compound is from the group of phenylene diisocyanate compounds, e.g., toluene diisocyanate.

Figure 2:
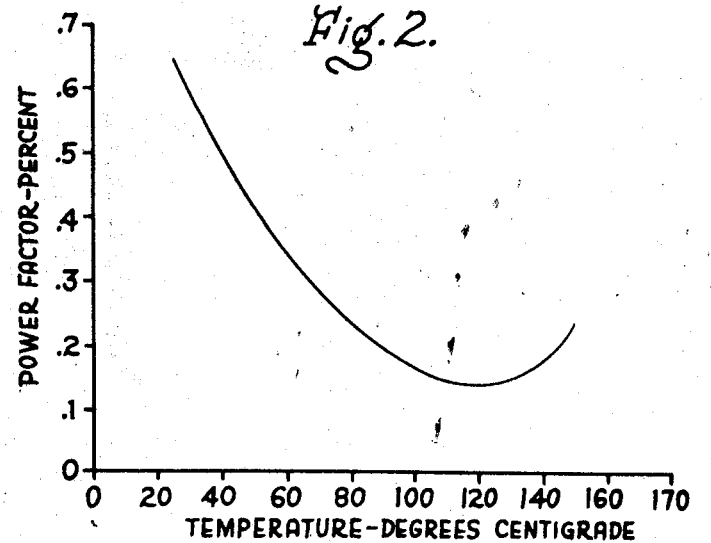

The invention will be better understood from the following description taken in conjunction with the accompanying drawing, in which:

FIG. 1 illustrates an electrical capacitor in which the dielectric material of the present invention may be incorporated; and
FIG. 2 graphically illustrates the superior electrical properties of a capacitor incorporating dielectric films of the present invention.

Referring now to the drawing, and particularly to FIG. 1, there is shown a rolled type capacitor in which the invention may be embodied. The capacitor comprises a pair of convolutely wound electrode foils 1 and 2 of suitable metal, e.g., aluminum, each foil being coated with a dielectric film 3 and 4 typically .1 to 1 mil thick and of a composition more fully described hereinafter. The dielectric films 3, 4 preferably are offset from opposite edges of the respective foils 1 and 2 so as to leave exposed metal margins 1a, 2a. Terminals 5, 6 are electrically connected to the opposite exposed foil edges by a metallic connection 7 produced by a Schooping, soldering or other suitable process, as well known in the art. If desired, the capacitor may be further treated with dielectric impregnants of various types, such as mineral oil, polyisobutylene, chlorinated hydrocarbons, fluorinated esters, or other known capacitor impregnant materials.

In accordance with the invention, dielectric films 3 and 4 consist of a novel synthetic resin composition which affords excellent electrical properties in the capacitor which are especially evident at high temperatues and readily lends itself to the formation of superior dielectric film coatings on the capacitor electrodes. A resin composition found particularly satisfactory for the purposes of the invention is produced by the reaction of an epoxy resin, hexachloroendomethylenetetrahydrophthalic anhydride (hereinafter also referred to as chlorendic anhydride), and toluene diisocyanate.

By epoxy resin, as used herein, is meant a complex epoxide resin comprising a polyether derivative of a polyhydric organic compound, e.g., polyhydric alcohol or phenol, containing 1,2 epoxy groups. Such resins are disclosed in various places in the art, e.g., in Castan Patents 2,324,483 and 2,444,333, as well as British Patents 518,057 and 579,698. For the most part, these epoxide or ethoxyline resins are based on the resinous product of reaction between an epihalohydrin, e.g., epichlorohydrin, and a phenol having at least two phenolic hydroxy groups, for example, 2,2-bis (4-hydroxyphenyl)-propane, also commonly known as bisphenol-A. U.S. Patents 2,494,295, 2,500,600 and 2,511,913 also describe examples of ethoxyline resinous compositions which may be employed in the practice of the present invention. Epoxidized polyolefins comprise another example of an epoxide resin that may be utilized in the practice of this invention. By reference, the aforementioned patents are intended to be part of the present description of the ethoxyline resins and, for brevity, the ethoxyline resins will not be described other than that they contain more than one ethylene oxide group, e.g., from one to two or more epoxide groups per molecule. These are prepared by effecting reaction between a polyhydric phenol, for example, hydroquinone, resorcinol, and condensation products of phenols with ketone, for instance 2,2-bis (4-hydroxyphenyl)-propane with epichlorohydrin or by epoxidizing unsaturated compounds. Resinous products of the type described above are known as "Epon" resins which range from solids to viscous liquids and have molecular weights of the order of about 1,000 to 3,000. The Epon resins are sold by Shell Chemical Corp. and similar resins, known as Araldite resins, are sold by the Ciba Co., while still others are sold by the Bakelite Co. These complex resins contain epoxide groups or epoxide and hydroxyl groups as their functional groups and are generally free from other functional groups such as basic and acidic groups.

The Epon 1007 referred to in the following examples is the reaction product of epichlorohydrin with bis-(4-hydroxyphenyl) dimethylmethane, has an epoxy equivalent of 2000 to 2500, and has a melting point of 125 to 135° C.

The following is a typical formulation of the above-mentioned preferred dielectric composition of the invention given in parts by weight, it being understood that this and the following examples are set forth merely for the purpose of illustration and are not intended to limit the invention in any way:

*Example I*

| | Parts |
|---|---|
| Epon 1007 (Shell) | 78.8 |
| Chlorendic anhydride | 96.2 |
| Toluene diisocyanate | 8.8 |
| Methylethylketone | 472.5 |
| Ethylene glycol monoethyletheracetate | 26.3 |
| Toluene | 26.3 |

Resin films of the above composition were deposited on aluminum foil about 3 mils thick by dipping the foil in the prepared solution, after which films were air dried and cured for one hour at 150° C. The films were about .0003 inch thick and found to be uniform, continuous and void-free. In electrical tests made of capacitors incorporating such films the dielectric constant as measured at 60 cycles per second was found to be about 4, and the resistivity at room temperature measured at 85 volts D.C. after one minute of applied voltage was 49,000 megohm-microfarads. Of particular significance was the substantial reduction of power factor at elevated temperature which was exhibited by these films.

FIG. 2 illustrates the latter feature of the described dielectric film composition, the graph showing power factor in percent plotted against temperature in degrees centigrade. As shown, the power factor undergoes a substantial drop with a rise in temperature from room temperature to about 120° C. and is still very low at 150° C. This is in marked contrast to the usual types of resinous and liquid dielectric materials heretofore commonly used in capacitors, which exhibit an increasing power factor as the temperature rises in the same range.

While the dielectric resin composition containing chlorendic anhydride has been found particularly satisfactory, the invention is not limited thereto. Other alicyclic anhydrides such as endomethylenetetrahydrophthalic anhydride are useful. Aromatic anhydride components, such as pyromellitic dianhydride, and aliphatic anhydrides, notably dodecenylsuccinic anhydride, have also resulted in dielectric films with marked electrical and physical improvement when incorporated in the epoxy resin-diisocyanate system. In particular, compositions incorporating pyromellitic dianhydride have yielded dielectric films which are exceptionally stable when heat aged over prolonged periods.

Insofar as the organic diisocyanate component is concerned, compounds of this type other than toluene diisocyanate may be used, and in general phenylene diisocyanate compounds and alkyl substituted phenylene diisocyanate compounds can be employed within the scope of the invention.

The following are additional examples of compositions made in accordance with the invention, the ingredients being in parts by weight:

*Example II*

| | Parts |
|---|---|
| Epon 1007 | 18.9 |
| Toluene diisocyanate | 2.6 |
| Pyromellitic dianhydride | 6.8 |
| Toluene | 84.1 |
| Cyclohexanone | 84.7 |

A thin film of this resin showed a power factor of about 1.1 at 200° C. and when aged at 185° C. for 15 weeks showed no substantial change in power factor.

Compositions of the above type were also prepared wherein dimethylformamide was used as a solvent instead of toluene and cyclohexanone.

*Example III*

| | Parts |
|---|---|
| Epon 1007 | 18.9 |
| Toluene diisocyanate | 4.8 |
| Dodecenylsuccinic anhydride | 16.6 |
| Toluene | 84.1 |
| Cyclohexanone | 84.1 |

In general, in the mixtures provided by the invention the anhydride may vary from 20 to 150% based on the weight of the epoxy resin and the disocyanate compound may vary from 3 to 50% based on the weight of the epoxy resin. The actual proportions used in each case will vary depending on such factors as the desired viscosity and solids content of the mixture, the particular epoxy resin used, the application for which the composition is intended, and other factors. Various known types of organic solvents other than those specified above may be used in preparing the resin mixtures and the proportion thereof in the mixture may vary to provide a range of 1 to about 60% solids content, the particular proportion used depending on the viscosity, the thickness of coating desired, and other desired properties.

The resin solutions of the invention may be applied as coatings to the desired surfaces in any suitable manner, such as by dipping, spraying, application by rollers, and the like, and thereafter curing the applied resin by drying in air or heating in an oven. To provide exposed foil margins as shown in the illustrated capacitor electrodes, these areas can be appropriately masked during the coating process.

The dielectric coating material of the invention is characteriezed by good moisture and chemical resistance and exceptional stability under high temperature conditions, e.g., up to 185–200° C. It forms smooth, uniform void-free films when applied to metallic surfaces, such as aluminum foil, the films having excellent adhesion to the surface throughout its contact area and having adequate flexibility to avoid cracking when the coated foil is wound into capacitor coils or otherwise subjected to stresses in handling or manufacturing procedures. While the disclosed resin composition is of particular value in its application as a dielectric coating on capacitor electrodes, it is also adapted for a variety of other uses, such as enamels or protective coatings or impregants for other devices and structures. The resin may be deposited on or impregnated in various types of substrates such as glass or glass cloth, mica, asbestos, textile cloth, paper and the like, and, if desired, self-supporting films of the described resin product may be obtained by stripping the film from the coated substrate by suitable means.

Capacitors embodying dielectric spacers of the invention may have structures different from that shown in FIG. 1. For example, the synthetic resin dielectric material described may be interleaved as self-supporting films between the foil electrodes. Paper and other types of dielectric sheets may be used in conjunction with the epoxy-anhydride-diisocyanate films of the invention to provide a complex dielectric spacer system, particularly where the auxiliary spacer material is porous and is used for the purpose of enabling improved distribution of impregnating fluids in the capacitor. The described dielectric films may have conducting layers deposited thereon by known metallizing processes to provide electrodes on their surface, either when in the form of self-supporting films or in the form of coatings on a metal base. If desired, the dielectric spacer material between capacitor electrodes or conducting members of other electrical devices may be in the form of paper or other porous insulating sheets impregnated and/or coated with the described resin dielectric composition.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A hardenable composition of matter comprising (1) a complex epoxide resin composed of a polyether of a polyhydric organic compound selected from the group consisting of polyhydric phenols and alcohols, said polyether containing 1,2 epoxy groups, (2) a dibasic carboxylic acid anhydride and (3) an aromatic diisocyanate compound, the amount of the anhydride being 20–150% and of the diisocyanate being 3–50% by weight based on the weight of the epoxide resin.

2. A hardenable composition of matter comprising (1) a complex epoxide resin composed of a polyether of a polyhydric organic compound selected from the group consisting of polyhydric phenols and alcohols, said polyether containing 1,2 epoxy groups, (2) a dibasic carboxylic acid anhydride and (3) an organic diisocyanate compound selected from the group consisting of phenylene diisocyanate and alkyl substituted phenylene diisocyanate compounds, the amount of the anhydride being 20–150% and of the diisocyanate being 3–50% by weight based on the weight of the epoxide resin.

3. A hardenable composition of matter comprising (1) a complex epoxide resin composed of a polyether of a polyhydric organic compound selected from the group consisting of polyhydric phenols and alcohols, said polyether containing 1,2 epoxy groups, (2) an anhydride selected from the group consisting of hexacloroendomethylenetetrahydrophthalic anhydride, pyromellitic dianhydride, and dodecenylsuccinic anhydride, and (3) an organic diisocyanate compound selected from the group consisting of phenylene diisocyanate and alkyl substituted phenylene diisocyanate compounds, the amount of the anhydride being 20–150% and of the diisocyanate being 3–50% by weight based on the weight of the epoxide resin.

4. A composition of matter comprising the product obtained by reacting (1) a complex epoxide resin composed of a polyether of a polyhdric organic compound selected from the group consisting of polyhydric phenols and alcohols, said polyether containing 1,2 epoxy groups, (2) an anhydride selected from the group consisting of hexachloroendomethylenetetrahydrophthalic anhydride, pyromellitic dianhydride, and dodecenylsuccinic anhydride, and (3) an organic diisocyanate compound selected from the group consisting of phenylene diisocyanate and alkyl substituted phenylene diisocyanate compounds the anhydride being present in the range of 20–150% by weight based on the weight of the epoxide resin, and the diisocyanate being present in the range of 3–50% by weight based on the weight of the epoxide resin.

5. A composition of matter comprising the product obtained by reacting (1) a complex epoxide resin composed of a polyether of a polyhydric organic compound selected from the group consisting of polyhydric phenols and alcohols, said polyether containing 1,2 epoxy groups, (2) hexachloroendomethylenetetrahydrophthalic anhydride and (3) an alkyl substituted phenylene diisocyanate, the amount of the anhydride being 20–150% and of the diisocyanate being 3–50% by weight based on the weight of the epoxide resin.

6. A composition of matter comprising the product obtained by reacting (1) a complex epoxide resin composed of a polyether of a polyhydric organic compound selected from the group consisting of polyhydric phenols and alcohols, said polyether containing 1,2 epoxy groups, (2) pyromellitic dianhydride and (3) an alkyl substituted phenylene diisocyanate, the amount of the anhydride being 20–150% and the diisocyanate being 3–50% by weight based on the weight of the epoxide resin.

7. A composition of matter comprising the product obtained by reacting (1) a complex epoxide resin composed of a polyether of a polyhydric organic compound selected from the group consisting of polyhydric phenols and alcohols, said polyether containing 1,2 epoxy groups, (2) dodecenylsuccinic anhydride and (3) an alkyl substituted phenylene diisocyanate, the amount of the anhydride being 20–150% and of the diisocyanate being 3–50% by weight based on the weight of the epoxide resin.

8. A dielectric material comprising the reaction product of (1) a complex epoxide resin composed of the reaction product of a polyhydric phenol and an epihalogenohydrin, (2) hexachloroendomethylenetetrahydrophthalic anhydride and (3) toluene diisocyanate, the amount of the anhydride being 20–150% and of the diisocyanate being 3–50% by weight based on the weight of the epoxide resin.

9. An electrical device comprising spaced conductors adapted to have opposite polarity, and dielectric material between said conductors, said dielectric material comprising the reaction product of (1) a complex epoxide resin composed of a polyether of a polyhydric organic compound selected from the group consisting of polyhydric phenols and alcohols, said polyether containing 1,2 epoxy groups, (2) a dibasic carboxylic acid anhydride and (3) an aromatic diisocyanate compound, the amount of the anhydride being 20–150% and of the diisocyanate being 3–50% by weight based on the weight of the epoxide resin.

10. An electrical device comprising spaced conductors adapted to have opposite polarity, and dielectric material between said conductors comprising porous dielectric sheet material combined with a dielectric composition formed from the reaction product of (1) a complex epoxide resin composed of a polyether of a polyhydric organic compound selected from the group consisting of polyhydric phenols and alcohols, said polyether containing 1,2 epoxy groups, (2) a dibasic carboxylic acid anhydride and (3) an aromatic diisocyanate compound, the amount of the anhydride being 20–150% and of the diisocyanate being 3–50% by weight based on the weight of the epoxide resin.

11. An electric capacitor comprising a pair of wound electrodes of metallic foil, said metallic foil electrodes being separated by thin, uniform dielectric coatings on their surfaces, said dielectric coatings being composed of a synthetic resin material comprising the reaction product of (1) a complex epoxide resin composed of a polyether of a polyhydric organic compound selected from the group consisting of polyhydric phenols and alcohols, said poleyther containing 1,2 epoxy groups, (2) a dibasic carboxylic acid anhydride and (3) an aromatic diisocyanate compound the amount of the anhydride being 20–150% and of the diisocyanate being 3–50% by weight based on the weight of the epoxide resin.

12. An electric capacitor comprising a pair of wound electrodes of metallic foil, said metallic foil electrodes being separated by thin, uniform dielectric coatings on their surfaces, said dielectric coatings being composed of a synthetic resin material comprising the reaction product of (1) a complex epoxide resin composed of the reaction product of a polyhydric phenol and an epihalogenohydrin, (2) hexachloroendomethylenetetrahydrophthalic anhydride and (3) toluene diisocyanate, the amount of the anhydride being 20–150% and of the diisocyanate being 3–50% by weight based on the weight of the epoxide resin.

13. In an electrical device, an electrode member coated with a firmly adherent film composed of the reaction product of (1) a complex epoxide resin composed of a polyether of a polyhydric organic compound selected from the group consisting of polyhydric phenols and alcohols, said polyether containing 1,2 epoxy groups, (2) a dibasic carboxylic acid anhydride and (3) an aromatic diisocyanate compound, the amount of the anhydride being 20–150% and of the diisocyanate being 3–50% by weight based on the weight of the epoxide resin.

14. In an electrical device, an electrode member coated with a firmly adherent film composed of the reaction product of (1) a complex epoxide resin composed of the reaction product of polyhydric phenol and an epihalogenohydrin, (2) hexachloroendomethylenetetrahydrophthalic anhydride and (3) toluene diisocyanate, the amount of the anhydride being 20–150% and of the diisocyanate being 3–50% by weight based on the weight of the epoxide resin.

References Cited in the file of this patent

UNITED STATES PATENTS

| | | |
|---|---|---|
| 2,362,428 | Biggs | Nov. 7, 1944 |
| 2,582,985 | Greenlee | Jan. 22, 1952 |
| 2,594,979 | Nelson | Apr. 29, 1952 |
| 2,682,024 | Kohman et al. | June 22, 1954 |
| 2,768,153 | Shakal | Oct. 23, 1956 |